J. FORBES.
Cultivator.

No. 224,773. Patented Feb. 24, 1880.

Witnesses:
Fred. G. Dieterich
P. C. Dieterich

Inventor.
James Forbes
By Parker H. Sweet Jr.
his Atty.

UNITED STATES PATENT OFFICE.

JAMES FORBES, OF MOOERS, NEW YORK.

CULTIVATOR.

SPECIFICATION forming part of Letters Patent No. 224,773, dated February 24, 1880.

Application filed December 26, 1879.

*To all whom it may concern:*

Be it known that I, JAMES FORBES, of Mooers, in the county of Clinton and State of New York, have invented certain new and useful Improvements in Cultivators; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to improvements in cultivators; and it consists of a series of plows arranged upon a triangular frame attached to a vehicle running-gear, and capable of being raised or lowered at will by a hand-lever, and otherwise so constructed as to be adapted for wide or narrow rows or furrows, all as will be hereinafter more fully described, and pointed out in the claim.

Figure 1:
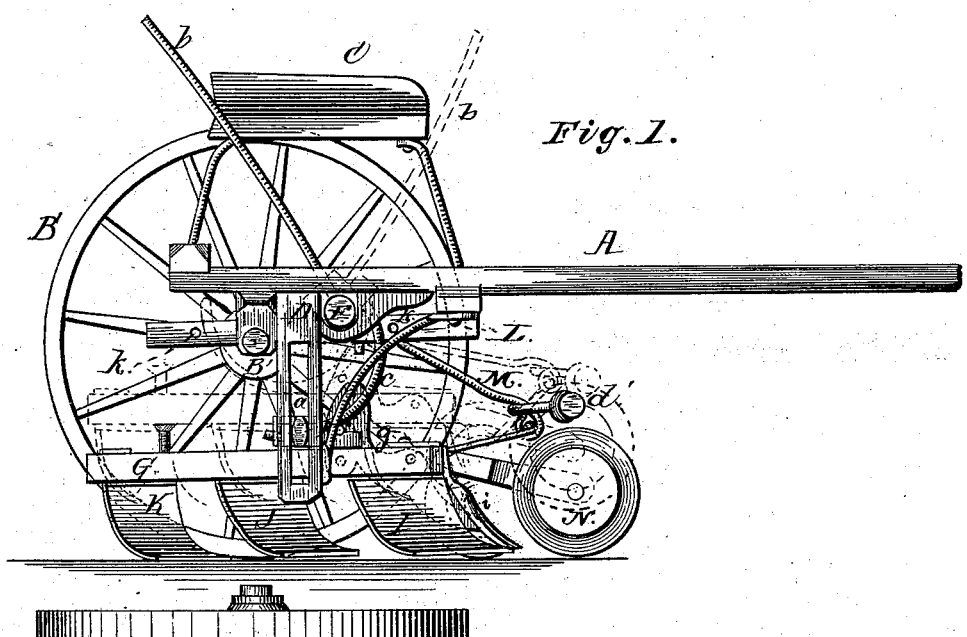
Figure 2:
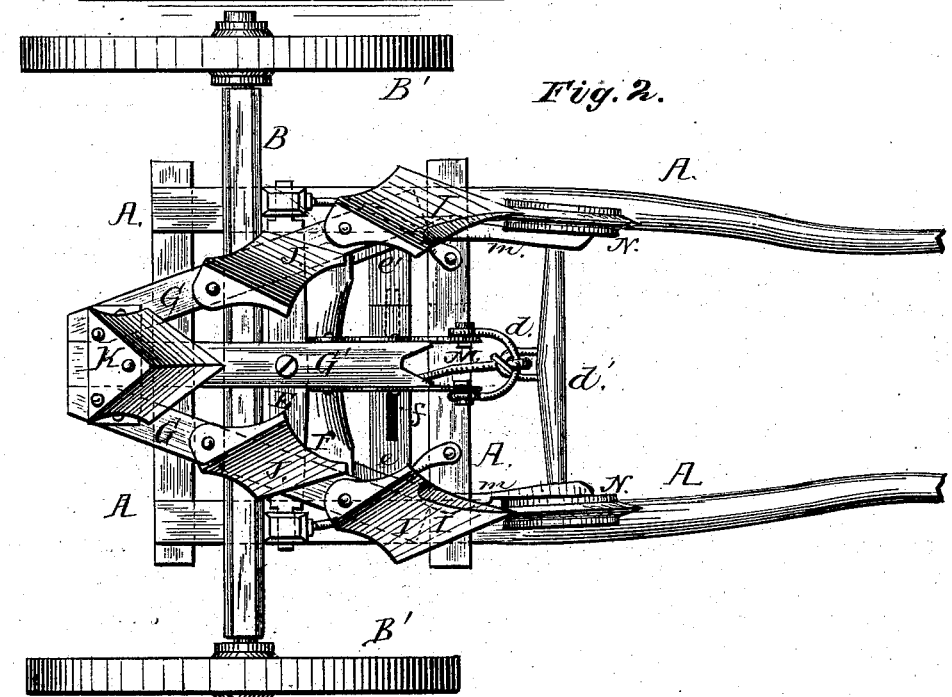

Referring to the drawings, Figure 1 represents a side view of my invention with one wheel removed to more fully explain and show the mechanism, and Fig. 2 represents a plan view of the cultivator-plows.

Similar letters of reference occurring on the several figures indicate corresponding parts.

A represents the frame and shafts, secured to the axle B, carrying the wheels B', and provided with a suitable seat, C, as shown. D represents a slotted bar, one on each side of the frame A, and projecting downward, in the slot $a$ of which move the ends of the sliding transverse bar E, to which the cultivator-frame is attached. F represents a rotating transverse bar, which has its bearings in the frame A, and is provided with a hand-lever, $b$, projecting above the seat C, and with downwardly-curved rods $c$, which pass through openings in the lower transverse bar, E, for the purpose of raising and lowering the transverse bar E, carrying the cultivator plows and frame, which is composed of the side beams, G, and central beam, G', arranged in a triangular shape, said beams G being hinged or pivoted at the rear or tapering end to the central beam, G', which is provided at the front with an adjustable clevis, $d$, carrying the whiffletree $d'$, as shown.

Across the front or broadest part of the beams G G G' are arranged two metallic plates, $e$ $e'$, which are securely fastened at one end to the beams G G, while the other ends, resting upon the central beam, G', are provided with elongated slots $f$, which overlap one another, and a clamping-screw passing through the same and entering the central beam, G', serves to clamp the plates at any desired length, to enable the beams G G to be moved nearer together or wider apart, to suit either wide or narrow rows or furrows.

I represents the two front land-side plows, arranged upon the forward ends of the beams G G opposite each other, and provided with the colters $i$, as shown. J represents the next two succeeding plows, arranged upon the beams G G in the rear of the plows I, and K represents the double plow, arranged at the rear ends of the beams G G' G', where they are pivoted or hinged together.

Beneath the frame A and rotating transverse bar F is securely fastened a beam, L, which is provided with openings $k$, within which fits the end of a rod, M, the opposite end of which is secured to the clevis $d$, attached to the whiffletree $d'$.

To the inner sides of the beams G' G' are attached projecting arms $m$, the outer ends of which are provided with wheels N, having sharp cutting-edges and a flanged shoulder, as shown. The object of these wheels is such that the sharp edges cut into the soil to the depth of the flanged shoulder, and serve to regulate the depth of the plowing, as well as to keep the cultivator in a straight line.

The construction of my invention being as described, it will be observed that in the operation of the same the two first plows turn two furrows, one each way next to the growing grain, which are succeeded by the next two plows turning another furrow on each side, and leaving it where the first furrows were taken from, and lastly comes the double plow, turning the balance of the ground over and leaving a dead-furrow in the center of the row, the weeds turned under assisting to keep the ground moist and furnishing a good fertilizer.

When it is desired to transport the cultivator from one place to another, or to raise the plows when in operation, the hand-lever $b$ is pulled forward and slipped around the front edge of the seat C, thereby causing the rotating transverse bar F to turn and operate the curved arms or rods c, which pulls up the cultivator-frame and plows, as shown in dotted lines in Fig. 1.

It may also be observed that my improved cultivator is adapted not only for use in connection with the vehicle-frame, but may be detached therefrom and supplied with the ordinary plow-handles and operated in the same manner as the ordinary cultivators, thus enabling the same to be furnished at a much less cost than what it could be when attached to the vehicle-frame.

Having thus described my invention, what I claim as new and useful is—

The triangular cultivator-frame G G G', carrying the plows I J K and gage-cutters N, and provided with the sliding transverse bar E, in combination with the slotted bars D and rotating transverse bar F, attached to the frame A, and having hand-lever b and curved arms or rods c, substantially as and for the purpose specified.

In testimony that I claim the foregoing as my own invention I affix my signature in presence of two witnesses.

JAMES FORBES.

Witnesses:
   J. F. PARKER,
   J. STACY.